Sept. 5, 1967  R. H. ANDERSON ET AL  3,339,254
FILE CONSTRUCTION
Filed March 28, 1966
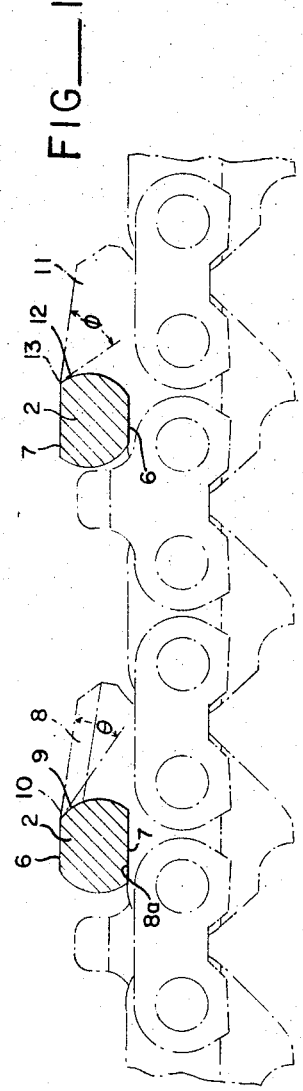
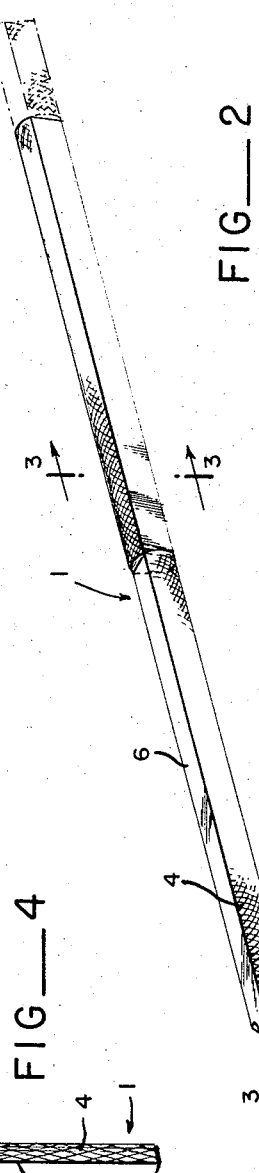
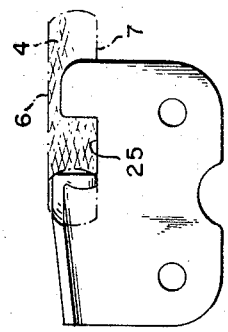
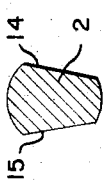
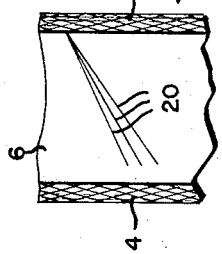
ROY H. ANDERSON
DOUGLAS J. LEMERY
INVENTOR.
BY *Seed & Berry*
ATTORNEYS

United States Patent Office 3,339,254
Patented Sept. 5, 1967

3,339,254
FILE CONSTRUCTION
Roy Hugh Anderson and Douglas James Lemery, Victoria, British Columbia, Canada, assignors to Atlas Chain Co., Ltd., Victoria, British Columbia, Canada
Filed Mar. 28, 1966, Ser. No. 532,804
4 Claims. (Cl. 29—78)

The present invention relates in general to sharpening files and more particularly to a file construction especially adapted for sharpening saw teeth or other cutting tools which must be filed to a predetermined configuration, as for example the leading edges and adjacent surfaces of saw chain cutting teeth.

According to the common practice in the art, saw teeth and particularly saw chain teeth are filed or sharpened periodically on the job or in the field by persons relatively unskilled at this work. Normally a simple round, flat or triangular file is carried by the person in the field and it is difficult to sharpen the rakers or cutters of a saw chain with any degree of preciseness. Thus, not only do the cutting teeth receive a poor job of sharpening, they are damaged by improper filing techniques.

The object of the present invention, therefore, is to provide an improved file construction whereby saw chain teeth, for example, may be properly and efficiently sharpened to a precise shape without damaging or weakening the chain links.

Another object of the present invention is to provide a file construction of the character described which is simple to use and requires no special skills for use in the field and which may be used to carry out the saw filing operation in an extremely rapid manner and without the use of cumbersome attachments or auxiliary devices which are objectionable.

A further object of the present invention is to provide a file construction of the character described wherein a plurality of predetermined saw tooth configurations may be accommodated by a single file tool.

Another object is to provide a file which is so constructed that it permits a new and novel method of filing to be employed.

Still further objects and advantages of the present invention will be apparent from the following specification and appended claims and from the accompanying drawings wherein:

FIG. 1 illustrates the application of the file construction of the present invention to diverse links of a saw chain;

FIG. 2 is a perspective view illustrating a plurality of sections of the file having chords of varying length;

FIG. 3 is a cross sectional view taken along lines 3—3 of FIG. 2;

FIG. 4 is an enlarged section of the file wherein guide lines are provided on the flat surface;

FIG. 5 illustrates the use of the file on a commonly used "router-type" saw chain link.

Referring now to the drawings, the file tool indicated generally at 1 may be constructed from a conventional circular cross-section file of the type normally used for saw filing and other general purposes. The file 1 comprises the circular, cylindrical body 2, a conventional tong 3, and the normal file teeth 4 on the surface of the file body. The present construction also provides one or more planar safety or guide surfaces such as the surfaces 6 and 7 formed on the body by removing a segment of the cross section.

As will be noted in FIG. 1, and as is conventional in saw chains, a raker tooth such as the tooth 8 is sharpened by forming the surface 9 adjacent the leading cutting edge 10 of the tooth with a precribed cutting angle $\theta$ while a cutter tooth such as the tooth 11, will be formed with a different surface 12 adjacent leading and cutting edge 13 such as the angle $\phi$. It will be noted in FIG. 1 that the top edge portion 8a of the link is flat and provides a resting and guiding surface for the file. This flat surface will be elongated as the tooth is filed.

According to the present invention, the various teeth of the saw chain may be consistently and precisely sharpened to the prescribed angle by providing the file body 2 with safety surfaces, such as the surfaces 6 and 7, with the diameter of the file and the chord defining the location of the surface, determining the angle given to the leading or cutting edge of the tooth. As seen in FIG. 1, the same file may be provided with a plurality of safety surfaces to accommodate diverse tooth angles. When the file is applied to a saw tooth, either the tooth 8 or the tooth 11, the safety surface rests on the flat portion of the link and the curvature of the cutting surface 4 of the file, which engages the saw tooth, will form the angle $\theta$ or the angle $\phi$ immediately adjacent the cutting edge of the tooth. It will be noted that the angle, either $\theta$ or $\phi$, is that angle formed between the top surface of the tooth and the tangent to the file surface at the point of intersection between the top surface of the tooth and the file engaging surface. Thus the location or extent of the chord defining the safety surface may be determined mathematically for any given file diameter so as to produce the desired surface on the tooth. Also, files of smaller or larger diameter may be used and adapted for proper filing of a given saw tooth by providing a chord of greater or less extent.

As seen in FIG. 2, the number of saw tooth cutting edge combinations which may be accommodated by a single file may be increased by sectioning the file into alternate positions of safety surfaces and cutting surfaces along the length of the file, limited only by the length of file which is practical and by the length of file section required for effective sharpening. The various safety surfaces formed on the file body may, of course, by appropriately marked so as to indicate the related saw tooth angle or to correlate the file section to the particular saw tooth for which it is intended.

As seen in FIG. 3, the opposed safety surfaces need not be parallel as in the case of FIGS. 1 and 2 but may be non-parallel such as the surfaces 14 and 15 so as to accommodate a wide range of saw tooth angles.

In FIG. 4 we have illustrated an enlarged section of the file and on the surface 6 we have provided angularly positioned guide lines 20 so that the person filing is provided with a relative guide as to the angle of the file with respect to the longitudinal direction of the chain. The filing angle may vary, depending upon the chain saw user and the type of wood being cut. We have indicated angles of 25°, 30° and 35° which are typical of the filing angles commonly used. Such angle lines may be provided on any or all of several surfaces 6 and 7.

In FIG. 5, we have illustrated a typical router-type cutting link such as is commonly used in present day commercial saw chains. In links as illustrated in FIG. 5, the depth gauge is formed on the same link as the cutter tooth which cuts both the side wall and bottom of the kerf. We have shown this tooth slightly modified in that the edge of the link, as at 25, is flat and is closer to the cutting edge of the tooth so that the surface 7 of the file as supported on the surface 25 is in proper relationship to the cutting edge of the tooth to be filed. The same relationship is provided in the saw chain construction illustrated in FIG. 1.

In the foregoing description, we have discussed a file which is generally circular in cross-section, however, it will be appreciated that the original cross-section may be elliptical or of any desired shape and a chord or safety surface will be provided so as to adapt the file for its intended use.

From the foregoing, it will be apparent to those skilled in the art that the present invention provides new and useful improvements in file construction of the character described. The present invention transforms the conventional file of the prior art to a precision instrument which is simple and fool proof. The file construction of this invention is a highly versatile saw filing tool and is adapted for use in the field. The arrangement and types of structural details utilized within this invention may be subjected to numerous modifications well within the purview of this invention and applicant intends only to be limited to a liberal interpretation of the specification and appended claims.

Having thus described the invention, what is claimed as new and desired to be secured by Letters Patent is:

1. File construction comprising: an elongated circular cross-section file body, file teeth on the surface of said body defining cutting surfaces, and a plurality of planar surfaces on said body defining safety surfaces at varying radial distances on the file body, each of said safety surfaces being formed by the removal of a segment of the file cutting surface defined by a chord on the file cross section, whereby the configuration of the cut made by the file is determined by the diameter of the file body and the location of the chords defining the safety surfaces.

2. The file construction according to claim 1 wherein; said file body is formed with at least two parallel diametrically opposed safety surfaces at different radial distances from the center of the file body.

3. The file construction according to claim 1 wherein; said file body is sectionalized along its length with at least two safety surfaces at varying radial distances being formed on each body section.

4. The file construction according to claim 1 wherein; said file body is sectionalized along its length with at least two safety surfaces at varying radial distances being formed on each body section; the safety surfaces and cutting surfaces of each adjacent section being formed at alternate positions on the circumference of the file body.

References Cited
UNITED STATES PATENTS

| | | | |
|---|---|---|---|
| 253,858 | 2/1882 | Fairbanks | 29—78 |
| 265,975 | 10/1882 | Nicholson | 29—78 X |
| 343,136 | 6/1886 | Moore | 29—78 |
| 1,528,177 | 3/1925 | Adams | 29—78 |

FOREIGN PATENTS

| | | |
|---|---|---|
| 137,495 | 5/1934 | Austria. |

HARRISON L. HINSON, *Primary Examiner.*